(12) United States Patent
Leber et al.

(10) Patent No.: US 11,543,020 B1
(45) Date of Patent: Jan. 3, 2023

(54) TRANSMISSION LUBRICATION SYSTEM WITH SHIELDED BEARINGS

(71) Applicant: Dana Heavy Vehicle Systems Group, LLC, Maumee, OH (US)

(72) Inventors: Mark W. Leber, Holland, OH (US); Langston H. Corn, Sylvania, OH (US); Jordan M. Houser, Sylvania, OH (US); Michael D. Cook, Holland, OH (US); Darren J. Ziskovsky, Bowling Green, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 17/384,605

(22) Filed: Jul. 23, 2021

(51) Int. Cl.
*F16H 57/04* (2010.01)
*H02K 7/116* (2006.01)
*F16H 57/02* (2012.01)

(52) U.S. Cl.
CPC ......... *F16H 57/0479* (2013.01); *F16H 57/02* (2013.01); *F16H 57/043* (2013.01); *F16H 57/0436* (2013.01); *F16H 57/0482* (2013.01); *H02K 7/116* (2013.01); *F16H 2057/02034* (2013.01)

(58) Field of Classification Search
None
See application file for complete search history.

(56) References Cited

U.S. PATENT DOCUMENTS

| | | | |
|---|---|---|---|
| 3,542,442 A * | 11/1970 | Kent | F16C 33/6677 384/473 |
| 4,222,283 A | 9/1980 | Nagy | |
| 5,366,419 A | 11/1994 | Oda | |
| 7,458,728 B2 * | 12/2008 | Kitamura | F16C 33/6614 384/468 |
| 7,811,000 B2 * | 10/2010 | Kawaguchi | F16H 57/0483 384/477 |
| 8,360,650 B2 * | 1/2013 | Morales Espejel | F16N 15/00 384/473 |
| 8,708,105 B2 | 4/2014 | Sowul et al. | |
| 9,534,633 B2 * | 1/2017 | Kanamoto | F16C 33/60 |
| 11,143,236 B2 * | 10/2021 | Wallin | F16C 19/542 |
| 2005/0220383 A1 | 10/2005 | Yokota et al. | |
| 2008/0310781 A1 | 12/2008 | Morales Espejel et al. | |
| 2009/0127954 A1 | 5/2009 | Mogi | |

FOREIGN PATENT DOCUMENTS

| | | | |
|---|---|---|---|
| CN | 112984091 A | * | 6/2021 |
| EP | 2061975 B1 | | 1/2014 |
| WO | 2008031777 A1 | | 3/2008 |

OTHER PUBLICATIONS

CN 112984091 translation (Year: 2021).*

* cited by examiner

*Primary Examiner* — Dirk Wright
(74) *Attorney, Agent, or Firm* — McCoy Russell LLP

(57) ABSTRACT

Methods and systems are provided for lubrication of a transmission. In one example, the transmission system may include a pair of shielded bearings attached to a first transmission shaft, each of the shielded bearings including at least one shield that forms a restriction between the shield and a race of the bearing and a cavity positioned axially between the pair of shielded bearings, wherein the restrictions tune lubricant pressurization in the cavity. The transmission system further includes a radial passage in the first transmission shaft in fluidic communication with the cavity and a lubricated transmission component.

20 Claims, 6 Drawing Sheets

TRANSMISSION LUBRICATION SYSTEM WITH SHIELDED BEARINGS

TECHNICAL FIELD

The present description relates generally to methods and systems for gearbox lubrication in a transmission.

BACKGROUND AND SUMMARY

Vehicle transmissions include moving components that can generate friction and heat, correspondingly, during operation, such as bearings, gears, and the like. In order to deliver oil to these components, transmissions have employed lubrication systems that route oil through a gearbox to lubricate selected components and decrease component wear. Efforts have been made to deliver oil to a variety of geartrain components which may be tightly packaged and difficult to sufficiently lubricate. Certain transmissions have utilized a dedicated oil distribution manifold in an attempt to pressurize the oil to drive oil flow to components throughout the transmission.

U.S. Pat. No. 5,366,419 A to Oda, for instance, teaches a transmission in a vehicle with a lubrication system within a transmission casing that includes an oil path with a shielded bearing designed to form an oil sump between a seal and the bearing on an output shaft. The shielded bearing and resulting oil sump collect oil due to gravitational forces. Further, other oil paths within the system serve to deliver oil to various portions of the transmission assembly, particularly by routing oil through central bores in multiple shafts for splash lubrication. However, Oda's transmission lubrication system does not include a pump and instead relies solely on splash lubrication to deliver oil to the transmission components.

The inventors have recognized several issues with Oda's lubrication system and other transmission lubrication arrangements. For instance, the system disclosed by Oda may not be capable of pressurizing oil to direct the oil to space-constrained areas of the transmission, as it relies on centrifugal forces to drive oil flow rather than using a pump and pressure regulating assembly for distributing oil. In particular, Oda's system does not offer an efficient method for strategically regulating the supply of lubricant based on the lubrication demands of a given system. Additionally, the reliance of Oda's transmission lubrication system on splash lubrication for oil circulation causes undesirable churning losses. Further, in lubrication systems utilizing an oil distribution manifold, tight tolerances for the manifold and surrounding components may be demanded for effective installation. Consequently, manufacturing and installation of the distribution manifold may be complex, time demanding, and costly.

To resolve at least a portion of the aforementioned issues, the inventors have developed a transmission system that includes a pair of shielded bearings attached to a transmission shaft. In the system, each of the shielded bearings include at least one shield that forms a restriction between the shield and a race of the bearing. The system further includes a cavity positioned between the pair of shielded bearings. The restrictions in the bearings enable lubricant pressurization within the cavity. The shielded bearings may therefore be configured to deliver a smaller portion of lubricant through the bearings to a lubricant seal, and to deliver a larger portion of oil to a bore in the transmission shaft, via a radial passage formed therein, to provide a greater amount of lubricant to moving components within a gearbox. Specifically, the axial bore of the transmission shaft is in fluidic communication with at least one lubricated transmission component. In this way, the shielded bearings provide a dual-use functionality: pressurizing lubricant in the cavity; and permitting transmission shaft rotation. By increasing the pressure of lubricant in the cavity, components which may be tightly packaged in the transmission, such as gears in a planetary gearset, may receive greater amounts of lubricant than previous systems. Consequently, transmission longevity may be increased.

As one example, to achieve the lubricant pressurization in the cavity, each of the shielded bearings may include a shield positioned on an axial side thereof. In such an example, each shield extends from an outer race of the corresponding bearing towards an inner race and forms the restriction. In this way, the shielded bearings may be contoured to achieve the dual-use functionality.

In another example, to achieve the lubricant pressurization in the cavity, at least one of the restrictions is at least partially formed by an annular plate that is fitted to a bearing bore in a housing of the transmission on an axial side of the corresponding shielded bearing spaced away from a lubricant inlet. In this example, the annular plate has an inner gap that defines the restriction between the annular plate and the transmission shaft. In this manner, an annular plate may be used to tune lubricant pressurization in the cavity to drive lubricant flow to tightly packaged components, for instance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-8 are drawn approximately to scale. However, other relative component dimensions may be used, in other embodiments.

DETAILED DESCRIPTION

The following description relates to a lubrication system in a transmission that constrains lubricant flow in certain areas of the transmission in order to effectively distribute lubricant to desired areas of the transmission. The lubrication system includes shielded bearings positioned on a transmission shaft. The shielded bearings are designed to restrict lubricant flow through the bearings in order to generate a pressurized flow of lubricant from a space between the bearings into a conduit in the transmission shaft. The pressurized lubricant may then be routed into another transmission shaft which distributes the lubricant to other areas of the transmission, such as regions with tightly packaged components (e.g., a planetary gearset). Each of the shielded bearings may include a shield which restricts the flow of lubricant therethrough such that the lubricant between the shielded bearings is pressurized. By supplying pressurized lubricant flow using restrictions in shielded bearings, the system may efficiently distribute a supply of pressurized lubricant that fulfills the demands of different transmission components using a more space efficient and potentially cost-effective flow restriction when compared to previous lubrication systems.

Figure 1:
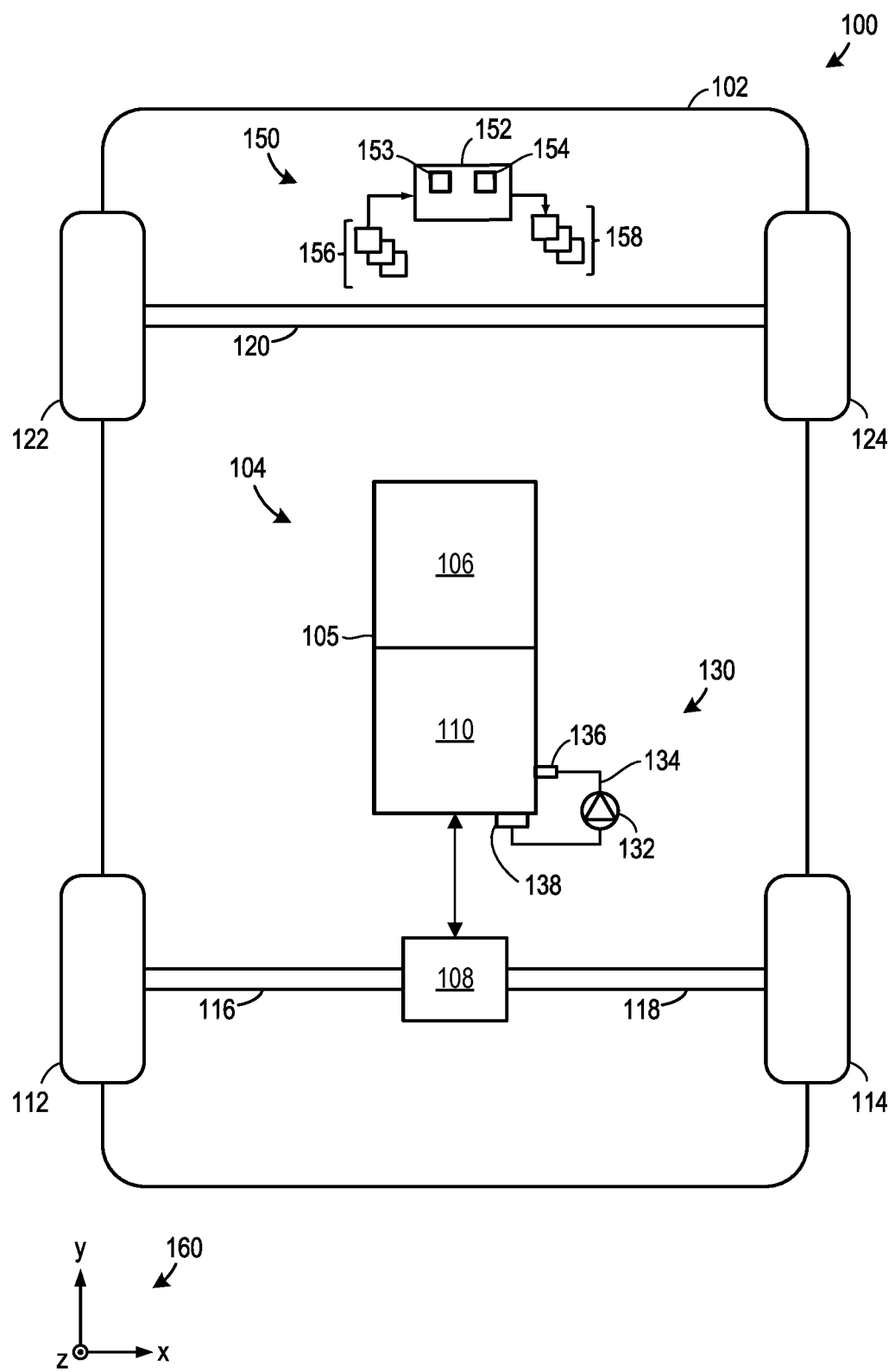
FIG. 1 shows a schematic representation of a vehicle transmission with a lubrication system.
Figure 2:
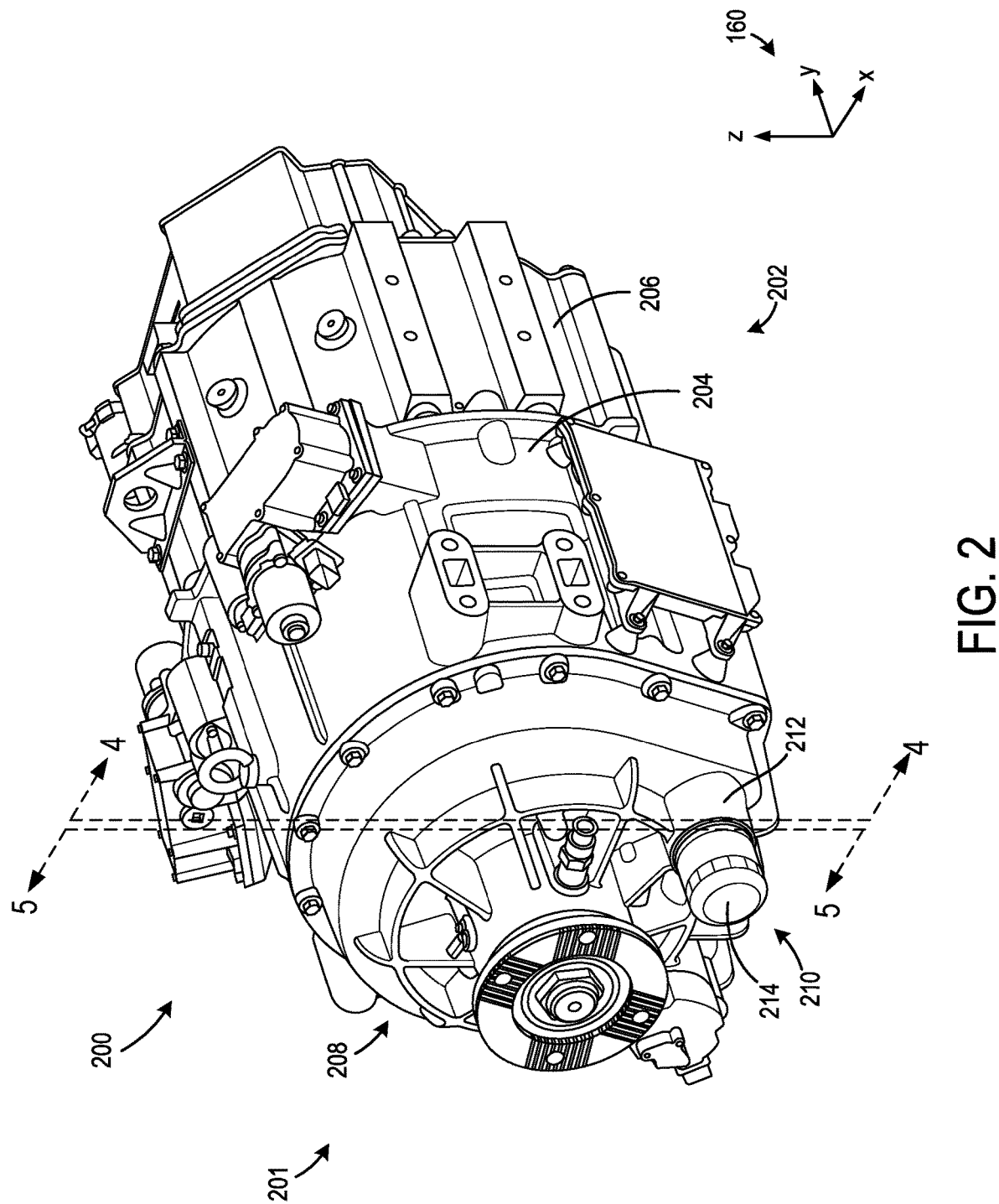
FIG. 2 shows a perspective view of a transmission, according to one example.
Figure 3:
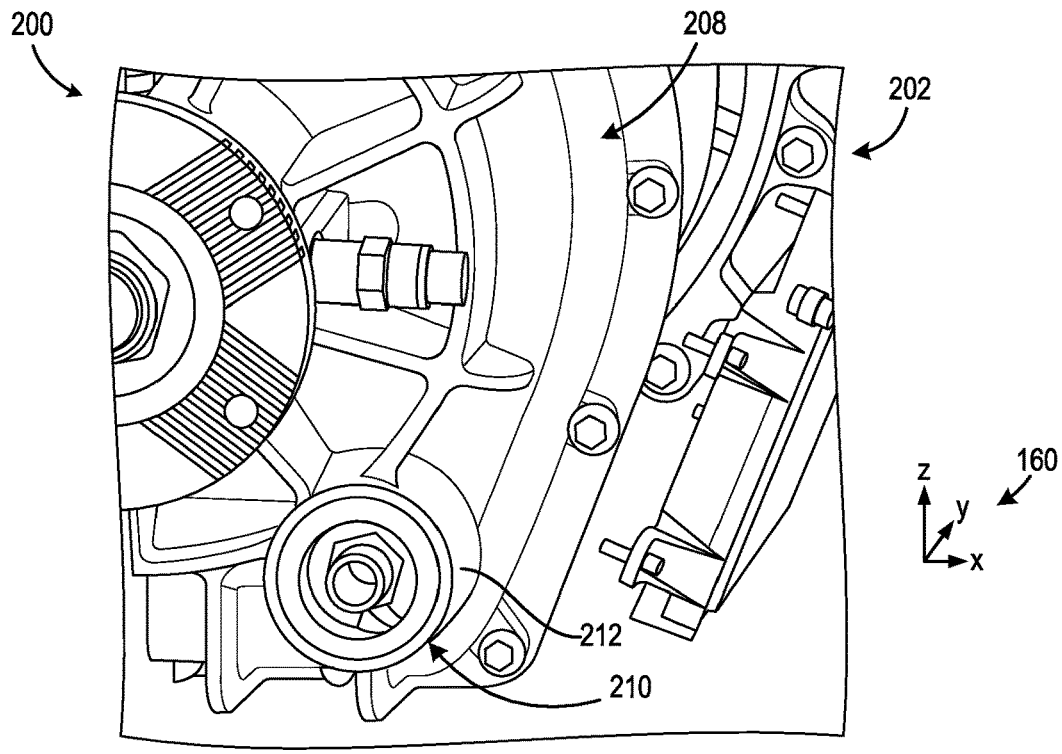
FIG. 3 shows a detailed view of a portion of the transmission, depicted in FIG. 2.
Figure 4:
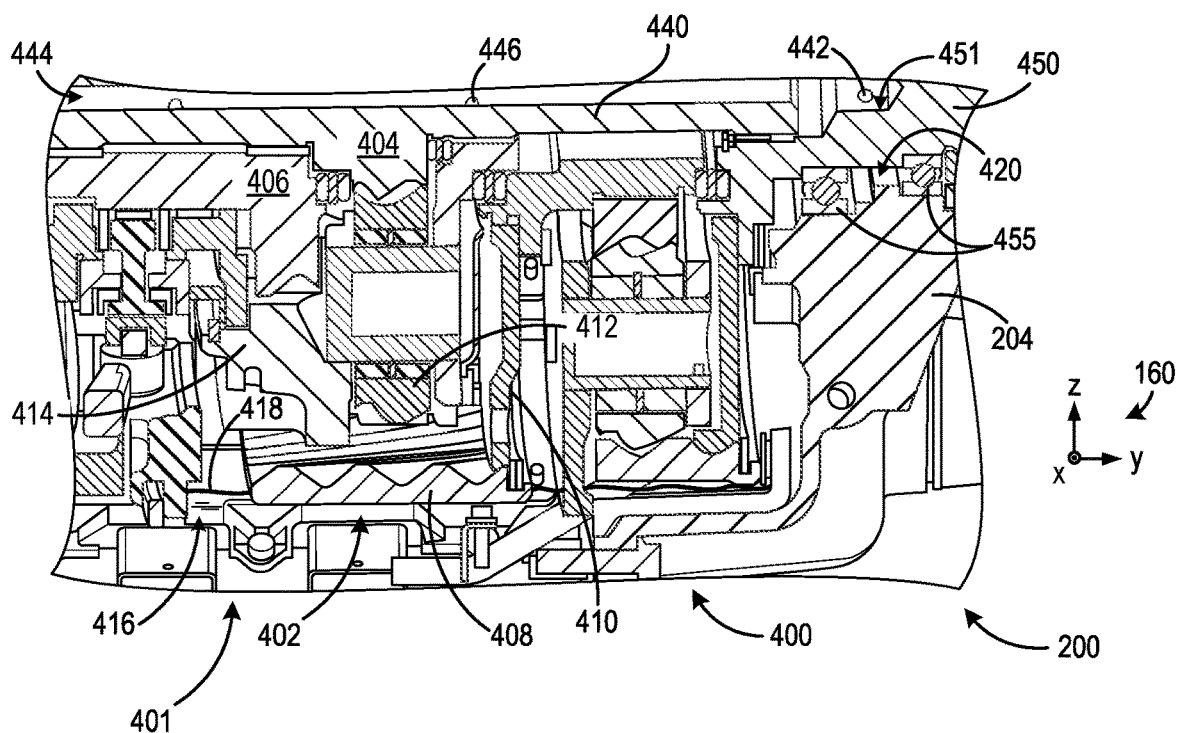
FIG. 4 shows a cross-sectional view of another portion of the transmission, depicted in FIGS. 1-2, with a planetary gearset.
Figure 5A:
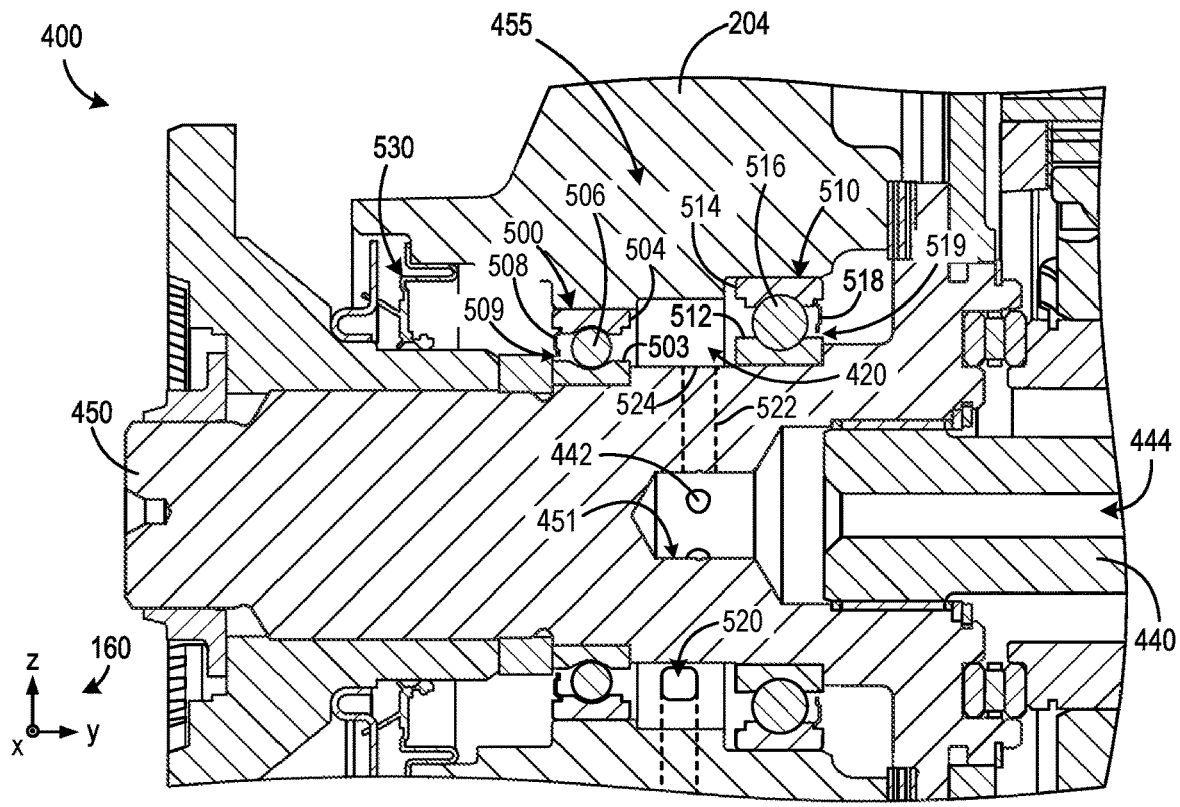
FIGS. 5A-5B show a cross-sectional view of shielded bearings in the transmission, depicted in FIGS. 2-4, with FIG. 5B illustrating a lubricant flow path therein.
Figure 5B:
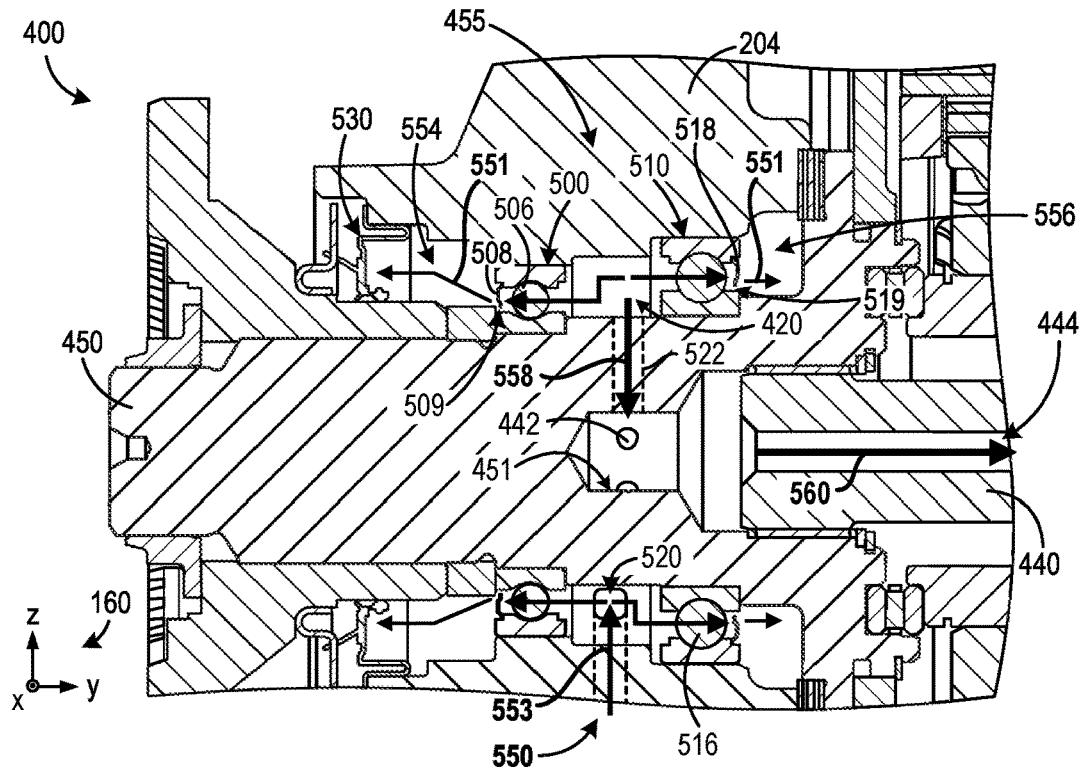
Figure 6:
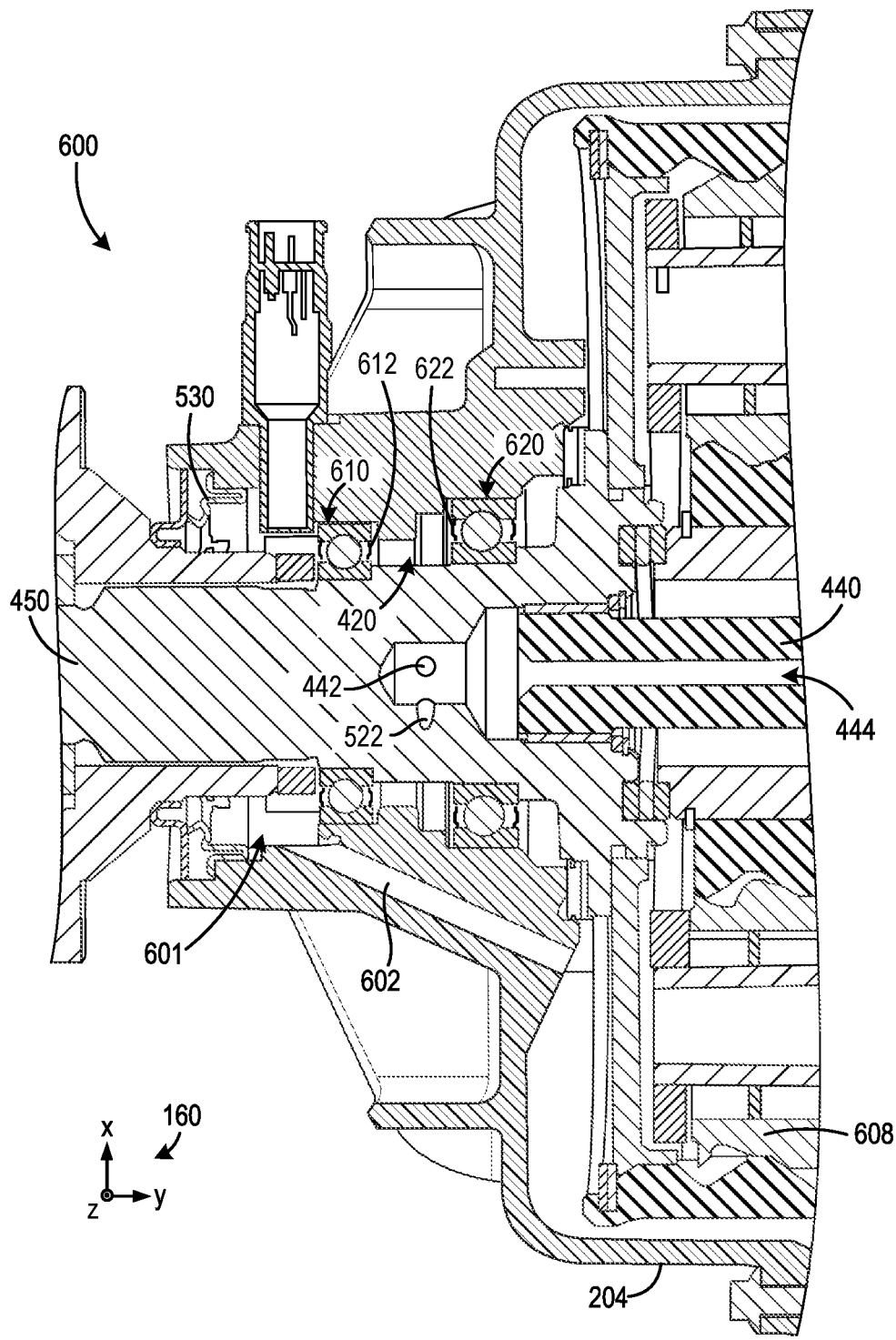
FIG. 6 shows another cross-sectional view of a transmission including shielded bearings, according to another example.
Figure 7:
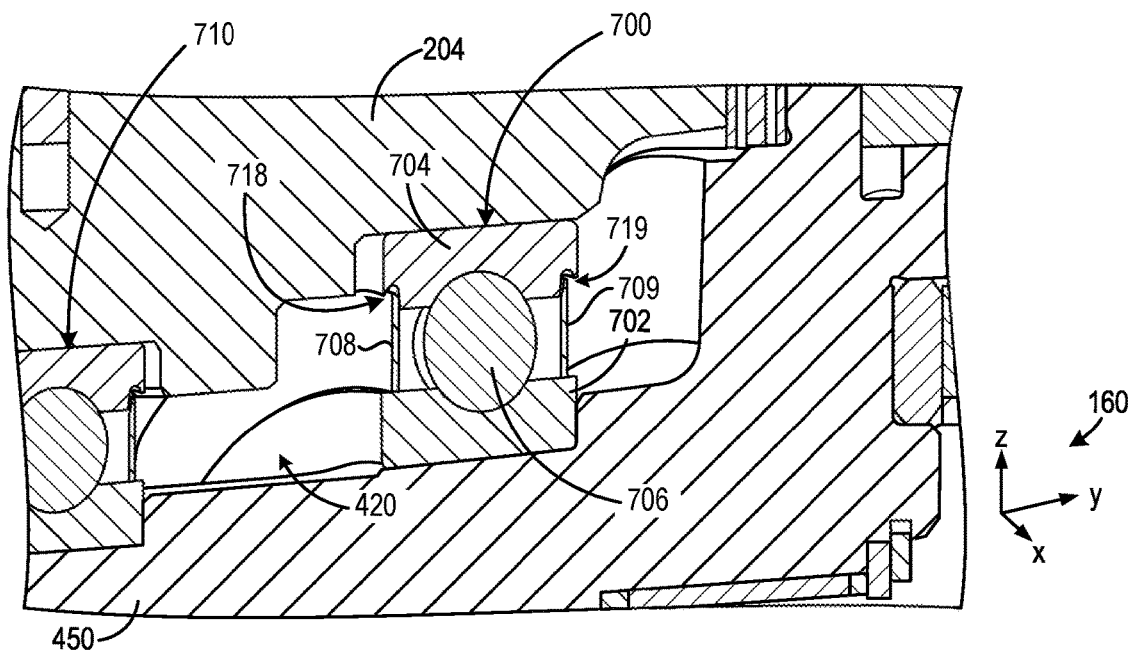
FIG. 7 shows a detailed view of another example of a shielded bearing in a transmission.
Figure 8:
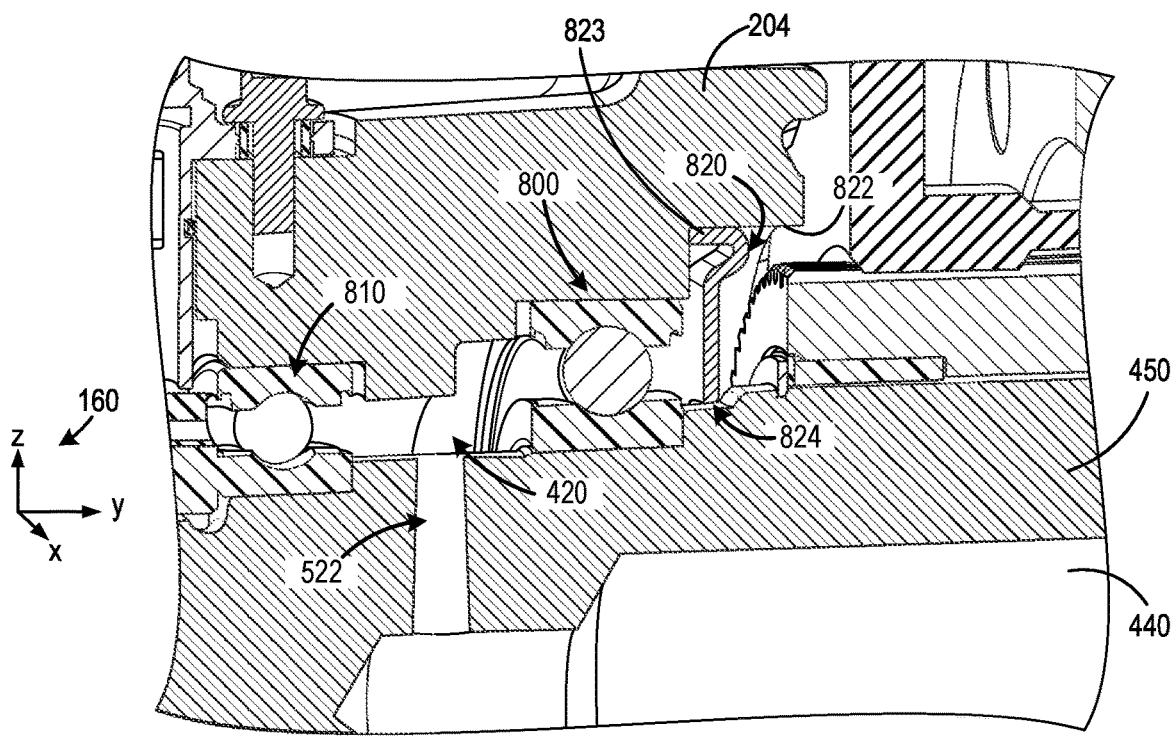
FIG. 8 shows a detailed view of an example of a shielded bearing assembly in a transmission.

FIG. 1 schematically illustrates a lubrication system in a vehicle transmission. FIG. 2 shows a transmission, and particularly a transmission housing, as described herein. FIG. 3 shows a detailed view of the transmission shown in FIG. 2. FIG. 4 depicts a portion of a transmission and lubrication system, where shielded bearings tune lubricant pressurization to provide a higher lubricant flowrate to selected transmission components. FIG. 5A shows the shields in the bearings that restrict lubricant flow to strategically direct higher pressure lubricant to space constrained areas of the transmission, and FIG. 5B illustrates a lubricant flow path through the transmission. FIG. 6 illustrates a portion of a transmission including a shielded bearing arrangement according to one example. FIG. 7 illustrates another detailed view of a shielded bearing with an alternate shield construction for lubricant flow restriction. FIG. 8 shows a restriction that is formed by an annular plate press fit into a bearing bore in the transmission.

FIG. 1 schematically illustrates a vehicle system 100 (e.g., electric drive system) included in a vehicle 102 with a powertrain 104. The vehicle may take a variety of forms in different embodiments such as a light, medium, or heavy duty vehicle. To generate power, the powertrain 104 may include a motive power source 106. The power source may include an electric motor (e.g., an electric motor-generator), an internal combustion engine (ICE) (e.g., a spark and/or compression ignition engine), combinations thereof, or other suitable devices designed to generate rotational energy. The internal combustion engine may include conventional components such as cylinders, pistons, valves, a fuel delivery system, an intake system, an exhaust system, and the like. Further, the electric motor may include conventional components such as a rotor, a stator, a housing, and the like for generating mechanical power as well as electrical power during a regeneration mode, in some cases. As such, the powertrain may be utilized in a hybrid or battery electric vehicle. In other examples, however, the vehicle may solely use an internal combustion engine for motive power generation.

The motive power source 106 may provide mechanical power to a differential 108 via a transmission 110. The power path may continue through the differential 108 to drive wheels 112, 114 by way of axle shafts 116, 118, respectively. As such, the differential 108 distributes mechanical power, received from transmission 110, to the drive wheels 112, 114 of axle shafts 116, 118, respectively, during certain operating conditions. In some examples, the vehicle 102 may further include a second axle 120 that is coupled to an ICE for providing mechanical power to wheels 122, 124.

The transmission 110 may be a powersplit, powershift, or hydrostatic transmission, in different examples. In the powersplit transmission arrangement, a mechanical branch and an electrical branch may be coupled in parallel. In the powershift transmission, friction clutches may be utilized and operation of said clutches may be coordinated to reduce power interruptions during shifting transients. In the hydrostatic transmission, a hydraulic pump coupled to a hydraulic motor may be used which jointly function to provide speed-torque conversion functionality. Further, in some examples, the transmission 110 may be designed to function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency in relation to transmissions which operate in discrete ratios. Alternatively, the transmission 110 may be another type of continuously variable transmission (CVT) capable of seamlessly shifting through a continuous range of gear ratios, such as a hydrostatic CVT, for instance. The hydrostatic CVT may use a variable displacement pump and a hydraulic motor to convert hydraulic pressure to rotation of an input shaft.

In some cases, the transmission 110 may include a geartrain with a planetary gearset. The planetary gearset may, in some cases, be a Ravigneaux-type gear assembly, which may provide a compact solution as compared to other geartrain architectures. Further, the differential 108 may be a locking differential, a limited slip differential, or a torque vectoring differential, in some examples.

In one example, the transmission 110 and the motive power source 106 may reside in a housing 105. The housing 105 may be formed in multiple sections that are coupled together by bolts or other suitable fasteners, such that the motive power source 106 resides in one portion of the housing and components of the transmission 110 reside in another portion of the housing. In other designs, the housing 105 may be formed as a monolithic structure. In still other examples, the transmission 110 and the motive power source 106 may be housed in separate enclosures.

The transmission 110 may further include a lubrication system 130 designed to provide lubricant (e.g., natural and/or synthetic oil) to various transmission components. The lubrication system 130 may include a filter 138 and a pump 132 that drives a pressurized lubricant through a delivery line 134 to an inlet 136 of the transmission 110, in the housing 105, for example. In some examples, the pump 132 may be provided at an exterior portion of the transmission 110. However, in other examples, the pump may be included within the housing 105.

Specifically, in one example, the pump 132 of the lubrication system 130 may be designed to deliver lubricant in one region of the transmission, such as, for instance, near an output shaft of the transmission 110, where the lubricant may then be routed through other components in the transmission. In some cases, an arrangement of bearings and other components and passages within the transmission may allow for additional pressurization of the lubricant delivered by the pump 132, as will be described herein with reference to FIGS. 2-8, in order to facilitate lubricant distribution to tightly packaged transmission components. As such, the lubrication system may further include other suitable distribution components, such as nozzles, valves, jets, and the like.

The vehicle 102 may further include a control system 150 with a controller 152. The controller may include a processor 153 and a memory 154 with instructions stored therein that, when executed by the processor, cause the controller to perform various methods, control techniques, etc. described herein. The processor may include a microprocessor unit and/or other types of circuits. The memory may include known data storage mediums, such as random access memory, read only memory, keep alive memory, combinations thereof, etc.

The controller 152 may receive various signals from sensors 156 positioned in the vehicle 102 and the transmission 110. Conversely, the controller 152 may send control signals to various actuators 158 at different locations in the vehicle and transmission based on received signals and instructions stored in the memory 154 of the controller 152. For instance, the controller 152 may send command signals to the pump 132 and, in response, an actuator in the pump may be adjusted to alter the flowrate of lubricant delivered to downstream transmission components. The other controllable components in the transmission, and more generally the vehicle, may be operated in a similar manner with regard to sensor signals and actuator adjustment.

An axis system 160 is provided in FIG. 1, as well as FIGS. 2-8, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

FIG. 2 depicts an example transmission system 200 (e.g., electric drive system) including a housing 202. The transmission system 200 may be included in a vehicle, and the housing 202 may enclose transmission components and a motive power source (e.g., electric motor). As such, the transmission system 200 and housing 202 may be similar to the powertrain 104 and housing 105 depicted in FIG. 1. The transmission system 200 may thus further include a lubrication system 201 for routing lubricant to lubricate various transmission components within the housing 202.

In one example, the housing 202 may be formed as multiple housing components 204, 206 coupled together by bolts or other suitable fasteners. In some cases, the housing components 204, 206 may enclose the transmission and the electric motor, respectively. Further, a cover 208 may be coupled to the housing component 204 at one end of the housing 202 (e.g., via bolts or other suitable fasteners), so as to enclose the components of the transmission system. In other examples, however, different housing configurations have been envisioned, such as, for instance, the housing 202 being formed as a monolithic structure, coupled with the cover 208, to enclose the transmission and the electric motor.

In some examples, the cover 208 may include a filter assembly 210, which may be included in a lubrication system 201. The filter assembly 210 may have a filter housing portion 212, formed in the cover 208, and a filter cover 214.

FIG. 3 again illustrates the housing 202 of the transmission system 200 with the cover 208 and filter assembly 210, particularly illustrating the filter housing portion 212 with the filter cover 214, shown in FIG. 2, removed. As described herein, the filter assembly 210 may be in fluidic communication with a sump within the housing 202, receiving and filtering lubricant therefrom, and in fluidic communication with a pump to route lubricant back into the housing 202. Specific lubricant routing schemes and corresponding structures within the transmission are further described herein with reference to FIGS. 4-5B.

FIGS. 4-5B show cross-sectional views of the transmission system 200, in a first example, further illustrating a transmission 400 housed within the housing component 204. The cross-sectional views shown in FIGS. 4 and 5A-5B are defined by longitudinal cuts taken along dashed lines 4-4 and 5-5, respectively, of the housing 204 of the transmission system 200 of FIG. 2, in order to show an interior of the transmission. Thus, the longitudinal cut planes may pass through a central rotational axis of the transmission. In some examples, it may be desired to route lubricant within the transmission to lubricate various components therein.

FIG. 4 illustrates a geartrain 401 of the transmission system 200 for transmitting power from a shaft 440 to a shaft 450. In one example, the shaft 440 may be an input shaft coupled to an electric motor, and the shaft 450 may be an output shaft. Further, the input shaft 440 may be disposed within an inner cavity 451 of the output shaft 450. The output shaft 450 may be supported in the housing component 204 by a pair of bearings 455, the structural and functional details of which will be elaborated on herein, particularly with reference to FIGS. 5A-5B. In some examples, additional bearings (e.g., needle roller bearings) may be positioned at an interface between the input shaft 440 and the output shaft 450 to permit independent rotation of the input and output shafts.

The geartrain 401 may include a planetary gearset 402, which may include one or more lubricated components. In some examples, the planetary gearset 402 may be a Ravigneaux planetary gearset. In such an example, the Ravigneaux planetary gearset may include a first sun gear 404 on the input shaft 440, a second sun gear 406, a ring gear 408, and a common carrier 410 with a first set of planet gears 412 and a second set of planet gears 414 residing thereon. The first set of planet gears 412 may mesh with the first sun gear 404 and the second set of planet gears 414 may mesh with the second sun gear 406 and the ring gear 408. In some examples, to achieve different gear ratios within the transmission system 200, different gear components of the Ravigneaux planetary gearset 402 may be selectively grounded. In one particular example, the carrier 410 may be grounded to the housing 204 in a first gear ratio. The carrier may therefore remain stationary during certain operating conditions.

The Ravigneaux planetary gearset may be compact and thus present difficulties with regard to lubricant distribution. To overcome these difficulties, the transmission system 200 may be designed to route pressurized lubricant (from a pump) into the housing and through the output shaft 450 to the input shaft 440, whereby the lubricant may be directed specifically towards the tightly packaged gearset at a pressure sufficient to meet the lubrication demands of the gearset's components.

Due to the internal routing of pressurized lubricant to the planetary gearset 402, in the previously described manner, the lubrication system may permit the level of lubricant in a sump 416 to be decreased, if wanted. In some examples, the lubricant sump 416 may have a lubricant level 418, which may be low enough to decrease churning losses when compared to previous transmission lubrication designs, where a higher lubricant level in the sump may lead to greater churning losses which may result in a higher operating temperature, decreased efficiency, and reduced longevity. However, the lubricant system described herein allows lubricant to be routed internally to selected transmission components that may have been formerly splash lubricated. Consequently, the lubricant level in the transmission may be decreased while enabling the lubricant demands of the transmission components to be met, if wanted. For instance, the lubricant level 418 of lubricant in the sump 416 may be kept lower than the planet gears 412 and/or 414. As a further example, the lubricant level 418 may be kept lower than the carrier 410, in some cases. Alternatively, the lubricant level may be higher than the carrier, in other embodiments. Further, by internally routing lubricant through the shafts, components that may remain stationary during some conditions, such as the carrier in the planetary assembly, may receive additional lubrication when compared to transmissions solely using splash lubrication.

In order to achieve pressurized flow of lubricant to the carrier 410, or to any other component where greater lubrication is desired in other examples, a pump of the lubrication system (e.g., the pump 132 of the lubrication system 130, shown in FIG. 1) may be utilized to provide a pressurized flow of lubricant through a lubricant inlet passage in the housing component 204 to a cavity 420 formed between the pair of bearings 455, the cavity further defined between the housing 204 and an inboard end of the output shaft 450. A portion of the pressurized lubricant flow may be directed into the pair of bearings 455, as well as other transmission components. However, it will be understood that in some examples, a greater portion of the lubricant flow may be desired for lubricating the carrier 410 of the planetary gearset 402, clutches in the planetary gearset, and the like as compared to other transmission components.

To tune lubricant distribution via the pressurization of lubricant in the cavity 420, the bearings 455 are shielded bearings. Each bearing therefore includes one or more shields on axial sides thereof which restrict a flow of lubricant through the bearings, thus further pressurizing the lubricant within the cavity 420. The pair of shielded bearings 455 are positioned on opposing sides of the cavity 420. In one particular example, each bearing includes at least one shield on one axial side of each respective bearing spaced away from the cavity.

In the example shown in FIGS. 5A-B, the shields 508, 518 may each be formed with an annular shape. Further, the shields 508, 518 may be press fit into the bearing such that they extend from an outer race towards an inner race, thereby forming a lubricant restriction between the shield and the inner race. Specific details of the shielded bearings, in different examples, as well as specific lubricant routing schemes, are elaborated on herein, though it will be understood that the shielded bearings may be designed to constrain flow of lubricant therethrough due to the arrangement of the shields. Thus, a larger flow of pressurized lubricant within cavity 420 may thus be directed through a radial passage in output shaft 450 into at least one opening 442 at an axial end of input shaft 440. In some examples, the input shaft 440 may include four openings 442, each being a radial opening in fluidic communication with the cavity 420 via the radial passage in the output shaft 450. However, in other examples, a different number of openings may be provided in the input shaft 440, which may not be radially oriented, though non-radial orientations may cause rotational imbalances in the transmission system.

In one example, the output shaft 450 may be formed with an inner cavity 451, at an axially inboard end thereof, in which the input shaft 440 is received. Specifically, the input shaft 440 may be disposed in the inner cavity so that the one or more openings 442 in the input shaft are positioned within the inner cavity so as to receive lubricant flowing from the cavity 420 (e.g., external to the output shaft) into the inner cavity of the output shaft. In this way, the lubricant may flow from the cavity 420 through the radial passages in the output shaft, towards the inner cavity 451, and into the input shaft 440 via the one or more openings 442.

The input shaft 440 may further include an axial bore 444 in fluidic communication with the one or more openings 442, and at least one lubricant port 446 that extends from the axial bore 444 to an exterior of input shaft 440. As such, pressurized lubricant may be routed from the opening 442 into the axial bore 444 and out of the input shaft 440 via the one or more lubricant ports 446 in order to provide lubricant under pressure to lubricate a component of the planetary gearset 402 such as the carrier 410, clutches, and/or other gears. Thus, the portion of lubricant flowing to the openings 442 may be greater than the portion of the lubricant flowing through the bearings 455.

In some cases, providing a pressurized lubricant flow in this manner, tuning the pressurization of lubricant within the system using shielded bearings, an efficient and cost-effective way for routing and distributing lubricant to satisfy differing lubrication demands within the transmission may be realized. Further, using the pressurized flow of lubricant through the input shaft to route lubricant to the gearset components may decrease a dependency on splash lubrication in the transmission. In turn, this may allow for desired lubricant distribution and lubrication with a lower sump level within the transmission housing, thereby reducing churning losses that stem from the splash lubrication arrangement.

FIGS. 5A-5B again illustrate the transmission 400 of the transmission system 200, particularly illustrating details of the input and output shafts and the shielded bearings, with FIG. 5B showing one example of a lubricant flow path therein. Specifically, FIGS. 5A-5B show the input shaft 440 and the output shaft 450, supported in the housing component 204 via the pair of shielded bearings 455 which specifically includes a first and second shielded bearings 500, 510. Again, the cavity 420 may be defined between the shielded bearings 500, 510, further defined between the output shaft 450 and the housing component 204. Each of the shielded bearings 500, 510 may include an inner race 503, 512 and an outer race 504, 514, with roller elements 506, 516 held therebetween, respectively. In some examples the roller elements 506, 516 may be spherical balls. However, in other examples, other types of roller elements have been contemplated, such as cylindrical rollers, tapered rollers, and the like.

In one example, the shielded bearings 500, 510 further include shields 508, 518, respectively, which may each be positioned on an axial side of each bearing positioned away from the cavity 420. The shields 508, 518 may be coupled (e.g., press fit) to the outer race 504, 514 of each respective bearing and extend towards the inner race 503, 512, respectively. Thus, the shields 508, 518 form gaps 509, 519 between the respective shields and the inner races to define a flow restriction region, which will affect lubricant flow (and pressurization) to be further described with reference to FIG. 5B. In some examples, each of the shields 508, 518 may be formed as an annular component having an inner diameter and an outer diameter, with the restriction defined between the inner diameter and the inner race of the bearing. As such, the restrictions at gaps 509, 519 may also have an annular shape. Further, the shields may be press fit into the bearings. Specifically, the outer diameter of the shields may each be press fit into a recess in the outer race of the bearing.

In other examples, however, the shield may have a different shape, which may not be annular, altering the shape of the gap and potentially providing greater flow restriction therethrough. Still further, alternate shield configurations, shapes, and connections have been contemplated, such as, for instance, including two shields on each bearing, a shield coupled to the inner race and extending towards the outer race, etc.

FIG. 5A further illustrates a lubricant inlet channel 520 formed in the housing component 204 and opening to the cavity 420. Specifically, the cavity 420 may circumferentially extend between the housing component 204 and the output shaft 450. The lubricant inlet channel 520 may be in fluidic communication with a pump, as previously indicated. The lubricant inlet channel 520 may thus provide a pressurized flow of lubricant into the cavity, a portion of which may flow through the bearings 500, 510. However, due to the flow restriction regions formed by the shields 508, 518, a smaller portion of lubricant may be allowed to flow through the bearings when compared to the other passages in fluidic communication with the cavity 420. Lubricant pressure within cavity 420 is consequently increased.

In one example, a lubricant seal 530 may be provided at one end of the housing component 204, positioned axially outboard of the shielded bearing 500, so as to constrain the lubricant that flows through restriction formed in the shielded bearing 500. Since a lesser amount of lubricant may be demanded to lubricate the bearings 500, 510 and surrounding components, the shielded bearings may provide a simple and effective approach that can meet the lubricant demands of the bearings and surrounding components as well as more tightly packaged components in the geartrain such as the planetary gearset which may demand higher lubricant flowrates. As such, a greater portion of the pressurized lubricant within cavity 420 may flow through multiple radial passages 522 of the output shaft 450, entering the radial passage via a lubricant inlet 524 defined on an outer periphery of the output shaft 450. For instance, the output shaft 450 may include four, six, or eight radial passages. Further, the axial bore 444 of the input shaft 440 may be in fluidic communication with the radial passages 522 via the openings 442, as previously described, such that the pressurized lubricant may be routed from the cavity 420 to various transmission components with high lubrication demands via the axial bore 444.

Turning to FIG. 5B, a lubricant flow path 550 in the transmission 400 is depicted via arrows, the size of which may, in some cases, generally correspond to a pressure or flow of lubricant, with thicker arrows indicating a greater pressure and higher flow rate, as compared to a lubricant flow depicted by the thinner arrows. However, it will be understood that in practice the flow pattern has greater complexity than is captured by the lubricant flow path arrows.

In the lubricant flow path, lubricant flows from a pump to a lubricant inlet channel 520, as indicated by arrow 553. Next lubricant travels into the cavity 420 from the inlet channel 520. From the cavity 420, a smaller amount of lubricant flows axially through the bearings and past an interior axial side. Next the lubricant travels through the roller elements 506, 516 and the gaps 509, 519 formed by the shields 508, 518 and functioning as a restriction, to a space 554 between the bearing 500 and the lubricant seal 530, and to a space 556 axial outboard of the bearing 510 (indicated via arrows 551). Conversely, a greater amount of lubricant flows from the cavity 420 to radial passages 522 in the output shaft 450 as indicated via arrow 558. In this way, pressurized lubricant may be strategically directed to the radial passages from the cavity.

Thus, the pressurized lubricant is directed from the radial passages 522 in the output shaft 450 to the axial bore 444 of the input shaft 440 via opening 442, as indicated by arrow 558. The pressurized lubricant may then be routed through the input shaft 440, as indicated by arrow 560, and directed out of the input shaft (e.g., via lubricant ports 446, shown in FIG. 4) towards tightly packaged transmission components which may have higher lubrication demands, for example. For instance, the pressurized lubricant may be routed to the carrier 410 and/or other components in the planetary gearset 402, shown in FIG. 4. With the shielded bearings 500, 510 functioning to increase a lubricant pressure within cavity 420, the flow rate of lubricant through the axial bore 444 may enable the lubricant demands of targeted transmission components, such as the carrier, to be met.

Since the lubrication demands of the shielded bearings 500, 510 may be less than those of the gearbox components the lubricant flow pattern may be tuned to more aptly match these demands. For instance, the carrier may be grounded during certain operating conditions and consequently may demand a high lubricant flow because it does not pass through the sump and drive splash lubrication. The shielded bearings therefore function to effectively maintain a lubricant pressure within the cavity 420 to flow lubricant to the carrier and other targeted areas of the transmission via the axial bore 444 in a simple, cost-effective manner. In this way, the transmission system may avoid the use of a dedicated lubricant distribution manifold mounted therein to lubricate certain gearbox components, if wanted. Consequently, costs and complexities associated with manufacturing and installing the distribution manifold may be circumvented. Further, the shielded bearings may function to decrease lubricant flow to areas of the transmission with lower lubrication demands while directing more lubricant to components with greater lubrication demands. Thus, the bearings tune the lubricant flow in the transmission, while also serving to support and position the output shaft, so that the bearing structure offers an effective and inexpensive mechanism for achieving targeted gearbox component lubrication. This dual-purpose shielded bearing structure may be efficiently installed in the transmission configurations described herein, particularly in comparison to a dedicated manifold distribution ring for delivering lubricant to a specific gearbox component, in order to lubricate components within the transmission, as desired, without increasing a package size thereof.

FIGS. 1-5B provide for a method for operating a transmission lubrication system. The method includes directing lubricant into a cavity disposed between two shielded bearings that are coupled to an input shaft. For instance, lubricant may be pumped from the sump to the cavity's inlet channel via the pump. Next, the method includes pressurizing the lubricant in the cavity between the shielded bearings via the restriction of lubricant flow through the shield bearings. In this way, the bearings have a dual-use functionality and therefore tune the lubrication flow through tightly packed areas of the transmission to meet the lubrication demands of components in the transmission. The method further includes flowing the pressurized lubricant into the output shaft through radial passages that extend through the input shaft. Next, the method includes routing the pressurized lubricant from the input shaft to the carrier and/or other components in and around the planetary gearset.

FIG. 6 shows another cross-sectional view of a transmission system 600 with shielded bearings 610, 620 that have a different construction to the bearings 500, 510, shown in FIGS. 5A and 5B. Furthermore, the cross-sectional view shown in FIG. 6 may be defined by a horizontal cut through the transmission system 600 along the x-y plane or a plane parallel to the x-y plane. The transmission system 600 may share some common components with the transmission system 200, shown in FIGS. 2-5. Therefore, some components such as the input and output shafts 440, 450, respectively, housing component 204, lubricant seal 530, cavity 420, etc. share common numbering with components depicted in FIGS. 2-5B, and repeated description of these transmission components and the lubricant flow path may be omitted for brevity. Further, the general lubricant flow path for routing oil through the transmission shown in FIG. 6 may be similar to the lubricant flow path, shown in FIG. 5B. However, due to the variation in the shielding bearing construction, the flow pattern around the bearings may differ.

The shielded bearings 610, 620 are again positioned on the output shaft 450. In contrast to the previously described shielded bearings, each of the shielded bearings 610, 620 include a pair of shields 612 and 622 positioned on opposing axial sides of each bearing. The shields 612, 622 may extend from an outer race towards an inner race of the respective bearing, thereby forming two restrictions in each bearing. As such, the restrictions may be positioned between the shield and the inner race. The cavity 420 is again formed between the shielded bearings 610, 620, and further defined between the output shaft 450 and the housing component 204. In some cases, the inclusion of shields 612, 622 positioned on both axial sides of the shielded bearings 610, 620, respectively, may further restrict a flow of oil through each bearing to maintain an elevated pressure within the cavity 420 (for delivering pressurized lubricant into the axial bore 444 of the input shaft 440 via the radial passages 522 of the output shaft 450 and the opening 442 of the input shaft 440). However, in other embodiments a single shield may be positioned on an interior axial side of the bearings adjacent to the cavity.

FIG. 6 additionally illustrates a lubricant return path 602 in the housing component 204. Specifically, a portion of lubricant that flows through the shielded bearing 610 towards the lubricant seal 530 may further restrict the flow of lubricant, thus acting as a dam, such that lubricant may build up in a cavity 601 that is formed between the shielded bearing 610 and the lubricant seal 530. The lubricant within the cavity 601 may subsequently be routed into lubricant return path 602, and then return to a lubricant sump formed within a bottom portion of the housing. It will also be understood that lubricant delivered to transmission components by way of the axial bore 444 may also be collected in lubricant sump. Lubricant collected in the sump may then be routed back to a filter and a pump, as previously described, to be returned into the transmission 600 via a lubricant inlet channel of the housing which opens into the cavity 420.

FIG. 7 shows an alternative configuration of a pair of shielded bearings 700, 710 according to another example. The shielded bearings 700, 710 may reside in a transmission substantially similar to the transmissions depicted in FIGS. 2-6, and, as such, some transmission components depicted in FIG. 7 may share common numbering with transmission components depicted in previous figures. Further, the shielded bearings 700, 710 may substantially identical. Thus, the structural description of the shielded bearing 700, as discussed herein, will be understood to also apply to the shielded bearing 710.

The shielded bearings 700, 710 may be positioned on the output shaft 450 to support the output shaft within the housing component 204, and may form a cavity 420 therebetween, as previously described. In this example, the shielded bearing 700 may include an inner race 702 and an outer race 704 with roller elements 706 (e.g., spherical balls, cylindrical rollers, and the like) held therebetween. In some examples, the shielded bearing 700 may include two shields 708, 709 positioned on opposing axial sides of the bearing. In contrast to the previously described shielded bearings, the shields 708, 709 may be coupled to the inner race 702 of the shielded bearing 700 and extend toward the outer race 704, such that a gap 718, 719 is formed between each shield 708, 709, respectively, and the outer race 704. For instance, the shields 708, 709 may be press fit into a recess formed in the inner race of the bearings. These gaps create flow restrictions, which may provide greater restriction than the single shield structure described with reference to FIGS. 4-5B, if wanted. Two shields with flow restrictions may therefore be used in the bearings when a higher pressure in the cavity is desired. However, in other examples, the gaps formed by the shields may be increased when two shields are used in the bearings to maintain a desired lubricant pressure in the cavity.

The shielded bearings 700, 710 may substantially identical, in one example. As such, the structural description of the shielded bearing 700, as discussed herein, may also apply to the shielded bearing 710, and the shields may create a similar flow restriction that constraints a flow of lubricant through the shielded bearing 710 (e.g., towards a lubricant seal). By tuning the lubricant pressurization within cavity 420 in this way, the flow rate of the lubricant traveling through the shielded bearings 700, 710 may be lower than the flow rate of lubricant in the output shaft that is routed to the planetary gearset components.

FIG. 8 shows an alternative configuration of a pair of bearings 800, 810 positioned on the output shaft 450 or other suitable transmission shaft, according to yet another example. In some cases, the bearings 800, 810 may not include shields positioned between inner and outer races thereof. The bearings 800, 810 may reside in a transmission substantially similar to the transmissions depicted in FIGS. 2-6, and, as such, the transmission components shown in FIG. 8 may share common numbering with the transmission components depicted in previous figures.

In order to restrict a flow of lubricant through at least one of the bearings and pressurize lubricant within the cavity 420, the bearing 800 of FIG. 8 may include an annular plate 820 fitted adjacent thereto in a bearing bore 822 of the housing component 204, in one example. For instance, the annular plate 820 may be press fit into the bearing bore 822 formed in the housing component 204. The annular plate 820 may have an axially extending flange 823 that defines a peripheral portion designed to fit into the bearing bore 822. An inner diameter of the annular plate 820 may be slightly larger than an outer diameter of the output shaft 450, so that a gap 824 is formed therebetween for restricting lubricant flow through the bearing 800. In some examples, the annular plate 820 may be formed of stamped metal (e.g., steel, aluminum, and the like) or another suitable material, and function as a baffle for restricting the flow of lubricant through the bearing 800. Further, in some cases, a second annular plate may be incorporated with the bearing 810, potentially positioned on an outboard side thereof and similarly press fit into a bearing bore formed in the housing.

As illustrated, the annular plate 820 restricts lubricant flow near one of the bearings (e.g., on an axially inboard side of the bearing 800, which is positioned axially inboard of the bearing 810). Specifically, in one example where pressurized lubricant may flow from the cavity 420 through each of the bearings 800 and 810, and lubricant may flow through the bearing 810 to reach the lubricant seal, it may be desirable to incorporate the flow restriction formed by the annular plate 820, so as to enable a smaller amount of lubricant to be directed through the bearings, while an even larger portion of lubricant is routed under pressure (due to the restrictions formed by bearings 800, 810 and the annular plate 820) into the radial passages 522 towards targeted transmission components where lubrication is demanded. In some examples, however, an annular plate similar to the annular plate 820 may be incorporated into the bearing 810, on an axially outboard side thereof, to further restrict a flow of lubricant therethrough.

In still other examples, the bearings 800, 810 may be shielded bearings which provide additional flow restrictions and greater pressurization of lubricant within the cavity 420. For instance, the bearings 800, 810 may each include a shield on one axial side thereof, similar to the shielded bearings described in FIGS. 4-5B, or may include shields on each axial side thereof, similar to the shielded bearings described in FIGS. 6-7, or combination thereof. As such, bearings 800, 810 may include one or more shields connected to an outer or inner race of the respective bearing, on one or both axial sides thereof, and provide a flow restriction between each shield and the respective outer or inner race. In some cases, the type of shielded bearing configuration selected for use in the transmission may track with the desired lubricant flow or pressurization, where additional shields will provide greater flow restriction that forces pressurized lubricant into the radial passages 522 which distributes lubricant to downstream components.

The annular plate 820 may be implemented in addition to, or as an alternative to, the other shields disclosed herein, in order to direct a greater flow of lubricant through the output shaft into the input shaft for satisfying the lubricant demands of the transmission system. Thus, the combined shielded bearing structure with the annular plate may again provide an inexpensive and easy to install solution for meeting lubricant demands of gearbox components such as gears in the planetary arrangement, without the use of a distribution manifold which may be difficult to manufacture and install due to tight tolerance demands associated therewith.

The technical effect of the transmission and lubricant routing systems described herein is to offer a simple, cost-effective solution for satisfying the varying lubrication demands of different components within a transmission system. By utilizing shielded bearings to tune a pressurization in a lubricant flow, the various lubrication demands of different transmission components may be accommodated in an efficient manner with negligible effects on the overall size and weight of a transmission package, thereby avoiding increased costs and complexities recognized in other transmission lubrication systems, if wanted.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a transmission system is provided that comprises a pair of shielded bearings attached to a first transmission shaft, each of the shielded bearings including at least one shield that forms a restriction between the shield and a race of the bearing; a cavity positioned axially between the pair of shielded bearings, wherein the restrictions tune lubricant pressurization in the cavity; and a radial passage in the first transmission shaft in fluidic communication with the cavity and a lubricated transmission component.

In another aspect, an electric drive system is provided that comprises an output shaft rotationally coupled to an electric motor via a planetary gear reduction, wherein the output shaft comprises a plurality of radial passages; an input shaft coupled to the electric motor and having an axial bore in fluidic communication with said plurality of radial passages; a first shielded bearing and a second shielded bearing coupled to the output shaft and forming a cavity axially therebetween, wherein the plurality of radial passages open into the cavity; wherein the first and second shielded bearings each include a shield and a gap between the shield and a race that restricts lubricant flow therethrough and pressurizes lubricant in the cavity; and wherein the axial bore is in fluidic communication with a transmission component.

In yet another aspect, a method for operating a lubrication assembly in a transmission is provided that comprises directing a lubricant into a cavity disposed between a first shielded bearing and a second shielded bearing that are each coupled to a transmission shaft; pressurizing the lubricant in the cavity between the first and second shielded bearings via the restriction of lubricant flow through the first and second shielded bearings; flowing the pressurized lubricant into a second transmission shaft via a plurality of radial passages that extend through the first transmission shaft; and routing the pressurized lubricant from the second transmission shaft to a transmission component. In one example, the transmission component may be stationary during some operating conditions. In another example, the transmission component may be a carrier of a planetary gearset and the carrier is grounded. In yet another example, directing the lubricant to the cavity may include pumping lubricant from a lubricant sump within a housing of the transmission to an inlet channel that opens into the cavity.

In any of the aspects or combinations of the aspects, the transmission system may further include a second transmission shaft including an axial bore in fluidic communication with the radial passage, wherein the axial bore is in fluidic communication with the lubricated transmission component.

In any of the aspects or combinations of the aspects, each of the shielded bearings may comprise a shield positioned on an axial side thereof, wherein each shield may extend from an outer race of the corresponding shielded bearing towards an inner race of the shielded bearing and forms the restriction.

In any of the aspects or combinations of the aspects, the radial passage may include a lubricant inlet opening into the cavity; wherein the shields may be spaced away from the lubricant inlet of the radial passage on outer axial sides of the pair of shielded bearings.

In any of the aspects or combinations of the aspects, at least one of the restrictions may be at least partially formed by an annular plate that is fitted to a bearing bore in a housing of the transmission on an axial side of the corresponding shielded bearing spaced away from a lubricant inlet; and the annular plate may have an inner diameter that defines the restriction between the annular plate and the first transmission shaft.

In any of the aspects or combinations of the aspects, the transmission system may further comprise a lubricant seal positioned axially outboard of the pair of shielded bearings, wherein a portion of the lubricant flows axially outboard through one of the pair of shielded bearings and is blocked by the lubricant seal.

In any of the aspects or combinations of the aspects, at least one of the restrictions may be at least partially formed by an annular plate that is fitted to a bearing bore in a housing of the transmission on an axial side of the corresponding shielded bearing spaced away from a lubricant inlet; and the annular plate may have a gap that defines the restriction between the annular plate and the first transmission shaft.

In any of the aspects or combinations of the aspects, the lubricated transmission component may be a component in a planetary gearset.

In any of the aspects or combinations of the aspects, the planetary gearset may be a Ravigneaux planetary gearset.

In any of the aspects or combinations of the aspects, the transmission system may further comprise an inlet channel in fluidic communication with a lubricant pump.

In any of the aspects or combinations of the aspects, the first transmission shaft may be an output shaft and the second transmission shaft may be an input shaft coupled to an electric motor.

In any of the aspects or combinations of the aspects, each of the shields may be positioned on one side of the corresponding shielded bearing and extend from an outer race towards an inner race to form the gap between the shield and the inner race.

In any of the aspects or combinations of the aspects, the first shielded bearing may be positioned axially outboard of the second shielded bearing and limit flow of lubricant towards an end seal positioned axially outboard of the first shielded bearing on the output shaft.

In any of the aspects or combinations of the aspects, the transmission component may be a carrier designed to be selectively grounded.

In any of the aspects or combinations of the aspects, the carrier may not move through a lubricant sump within a housing of the electric drive system.

In any of the aspects or combinations of the aspects, the electric drive system may further comprise an inlet channel positioned radially outward from the plurality of radial passages and in fluidic communication with a lubricant pump.

In any of the aspects or combinations of the aspects, the first and second shielded bearings may be ball bearings.

In another representation, a transmission is provided that includes a pair of bearings coupled to a rotating shaft and mated with a housing bore, wherein a pressurized chamber is formed between the bearings via restrictions within the bearings or the housing bore that permit a pressurized amount of axial lubricant flow therethrough and wherein a plurality of radial passages extend from the pressurized chamber to a central conduit in the rotating shaft.

Note that the example control and estimation routines included herein can be used with various transmission and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various transmission hardware components in combination with the electronic controller.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. Thus, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system comprising:
a pair of shielded bearings attached to a first transmission shaft, each of the shielded bearings including at least one shield that forms a restriction between the shield and a race of the shielded bearing;
a cavity positioned axially between the pair of shielded bearings, wherein the restrictions tune lubricant pressurization in the cavity; and
a radial passage in the first transmission shaft in fluidic communication with the cavity and a lubricated transmission component.

2. The transmission system of claim 1, wherein each of the shielded bearings comprises a shield positioned on an axial side thereof, wherein each shield extends from an outer race of the corresponding shielded bearing towards an inner race of the shielded bearing and forms the restriction.

3. The transmission system of claim 2, wherein:
the radial passage includes a lubricant inlet opening into the cavity; and
the shields are spaced away from the lubricant inlet of the radial passage on outer axial sides of the pair of shielded bearings.

4. The transmission system of claim 1, wherein:
at least one of the restrictions is at least partially formed by an annular plate that is fitted to a bearing bore in a housing of the transmission on an axial side of the corresponding shielded bearing spaced away from a lubricant inlet; and
the annular plate has a gap that defines the restriction between the annular plate and the first transmission shaft.

5. The transmission system of claim 1, further comprising a lubricant seal positioned axially outboard of the pair of shielded bearings, wherein a portion of the lubricant flows axially outboard through one of the pair of shielded bearings and is blocked by the lubricant seal.

6. The transmission system of claim 1, wherein the lubricated transmission component is a component in a planetary gearset.

7. The transmission system of claim 6, wherein the planetary gearset is a Ravigneaux planetary gearset.

8. The transmission system of claim 1, further comprising:
a second transmission shaft including an axial bore in fluidic communication with the radial passage;
wherein the axial bore is in fluidic communication with the lubricated transmission component.

9. The transmission system of claim 8, wherein the first transmission shaft is an output shaft and the second transmission shaft is an input shaft coupled to an electric motor.

10. A method for operating a lubrication system in a transmission, comprising:
directing a lubricant into a cavity disposed between a first shielded bearing and a second shielded bearing that are each coupled to a first transmission shaft;
pressurizing the lubricant in the cavity between the first and second shielded bearings via the restriction of lubricant flow through the first and second shielded bearings;
flowing the pressurized lubricant into a second transmission shaft via a plurality of radial passages that extend through the first transmission shaft; and
routing the pressurized lubricant from the second transmission shaft to a transmission component.

11. The method of claim 10, wherein the transmission component is stationary during some operating conditions.

12. The method of claim 11, wherein the transmission component is a carrier of a planetary gearset and the carrier is grounded during selected operating conditions.

13. The method of claim 10, wherein directing the lubricant to the cavity includes pumping lubricant from a lubricant sump within a housing of the transmission to an inlet channel that opens into the cavity.

14. An electric drive system, comprising:
an output shaft rotationally coupled to an electric motor via a planetary gear reduction, wherein the output shaft comprises a plurality of radial passages;
an input shaft coupled to the electric motor and having an axial bore in fluidic communication with said plurality of radial passages;
a first shielded bearing and a second shielded bearing coupled to the output shaft and forming a cavity axially therebetween, wherein the plurality of radial passages open into the cavity;
wherein the first and second shielded bearings each include a shield and a gap between the shield and a race that restricts lubricant flow therethrough and pressurizes lubricant in the cavity; and
wherein the axial bore is in fluidic communication with a transmission component.

15. The electric drive system of claim 14, wherein each of the shields are positioned on one side of the corresponding shielded bearing and extend from an outer race towards an inner race to form the gap between the shield and the inner race.

16. The electric drive system of claim 14, wherein the first shielded bearing is positioned axially outboard of the second shielded bearing and limits flow of the lubricant towards an end seal positioned axially outboard of the first shielded bearing on the output shaft.

17. The electric drive system of claim 14, wherein the transmission component is a carrier designed to be selectively grounded.

18. The electric drive system of claim 17, wherein the carrier does not move through a lubricant sump within a housing of the electric drive system.

19. The electric drive system of claim 14, further comprising an inlet channel positioned radially outward from the plurality of radial passages and in fluidic communication with a lubricant pump.

20. The electric drive system of claim 14, wherein the first and second shielded bearings are ball bearings.

* * * * *